United States Patent
Bhat et al.

(10) Patent No.: US 7,793,301 B2
(45) Date of Patent: Sep. 7, 2010

(54) METHOD AND SYSTEM FOR PROVIDING EFFICIENT OBJECT-BASED NETWORK MANAGEMENT

(75) Inventors: Kong-Posh Bhat, Plano, TX (US); BalaSubrahmanyam Gattu, Richardson, TX (US); Michael D. Hall, Carrollton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1328 days.

(21) Appl. No.: 11/282,326

(22) Filed: Nov. 18, 2005

(65) Prior Publication Data
US 2007/0150563 A1 Jun. 28, 2007

(51) Int. Cl.
G06F 3/00 (2006.01)
G06F 9/44 (2006.01)
G06F 9/46 (2006.01)
G06F 13/00 (2006.01)

(52) U.S. Cl. .................. 719/313; 719/320; 709/223

(58) Field of Classification Search ............... 719/315, 719/318; 709/223
See application file for complete search history.

(56) References Cited

U.S. PATENT DOCUMENTS

| | | | | |
|---|---|---|---|---|
| 5,706,506 | A * | 1/1998 | Jensen et al. | 707/103 R |
| 5,838,970 | A * | 11/1998 | Thomas | 719/316 |
| 6,363,421 | B2 * | 3/2002 | Barker et al. | 709/223 |
| 6,393,481 | B1 * | 5/2002 | Deo et al. | 709/224 |
| 6,519,652 | B1 * | 2/2003 | Sadiq | 719/316 |
| 2003/0074430 | A1 * | 4/2003 | Gieseke et al. | 709/221 |
| 2005/0278693 | A1 * | 12/2005 | Brunell et al. | 717/106 |
| 2007/0078978 | A1 * | 4/2007 | Arnold et al. | 709/224 |

* cited by examiner

Primary Examiner—Diem K Cao

(57) ABSTRACT

A method for providing efficient object-based network management is provided. The method includes receiving a request for a reference to an object that represents at least one managed network element. A determination is made regarding whether the object is currently activated. The object is activated based on the request for a reference to the object when the object is not currently activated.

21 Claims, 4 Drawing Sheets

METHOD AND SYSTEM FOR PROVIDING EFFICIENT OBJECT-BASED NETWORK MANAGEMENT

TECHNICAL FIELD OF THE INVENTION

The present disclosure relates generally to communication networks and, more specifically, but not by way of limitation, to a method and system for providing efficient object-based network management.

BACKGROUND OF THE INVENTION

Computing systems in use today are often designed and implemented using a static approach to system resource utilization. These systems suffer from low performance and frequent costly hardware upgrades as the inefficient resource utilization becomes more of an issue over time. Therefore, there is a need for a more efficient method of accessing object-based resources in network management.

SUMMARY OF THE INVENTION

A method for providing efficient object-based network management is provided. According to an advantageous embodiment of the present disclosure, the method includes receiving a request for a reference to an object that represents at least one managed network element. A determination is made regarding whether the object is currently activated. The object is activated based on the request for a reference to the object when the object is not currently activated.

According to one embodiment of the present disclosure, the method also includes storing the reference to the object and a handle for the object when the object is not currently activated.

According to another embodiment of the present disclosure, the method also includes incrementing a count of references to the object.

According to still another embodiment of the present disclosure, the method also includes decrementing the count of references to the object and deactivating the object when the count of references to the object drops below a threshold. Activating includes creating an instance of the object, based on contents of a first memory store, in a second memory store, and deactivating includes deleting the instance of the object from the second memory store.

According to yet another embodiment of the present disclosure, the object is a resource object and receiving the request for the reference to the resource object comprises receiving the request for the reference to the resource object from a collaborating object. The method also includes retrieving the reference to the resource object when the resource object is currently activated and providing the reference to the resource object to the collaborating object.

According to a further embodiment of the present disclosure, the at least one managed network element associated with the resource object is managed at least partially by the collaborating object invoking one or more of the functions of the resource object.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

In network management systems, a management platform is responsible for providing the user interface that allows a network operator to perform management functions. Managed elements within the network may report faults and measurement data to the management platform, which is able to ascertain the health of the overall network and make adjustments when necessary. The management platform may also issue commands to control the managed elements.

Emerging technologies such as object-orientation and abstraction techniques provide a powerful opportunity for optimal resource utilization, resulting in reduced operational and maintenance costs. In object-oriented programming, an object is typically created at a management platform to represent each managed element. Thus, as the number of managed elements increases, the number of objects stored in the management platform increases in direct proportion. However, many IP-based network management systems and other types of data networks may have thousands of managed elements, and in the future sensor networks may have millions of managed elements. Instantiating an object for each of these managed elements in the management platform may not be possible due to memory constraints or, even if possible, may be an extremely inefficient use of memory as only a small percentage of the objects are typically providing service at any particular time.

Figure 1:
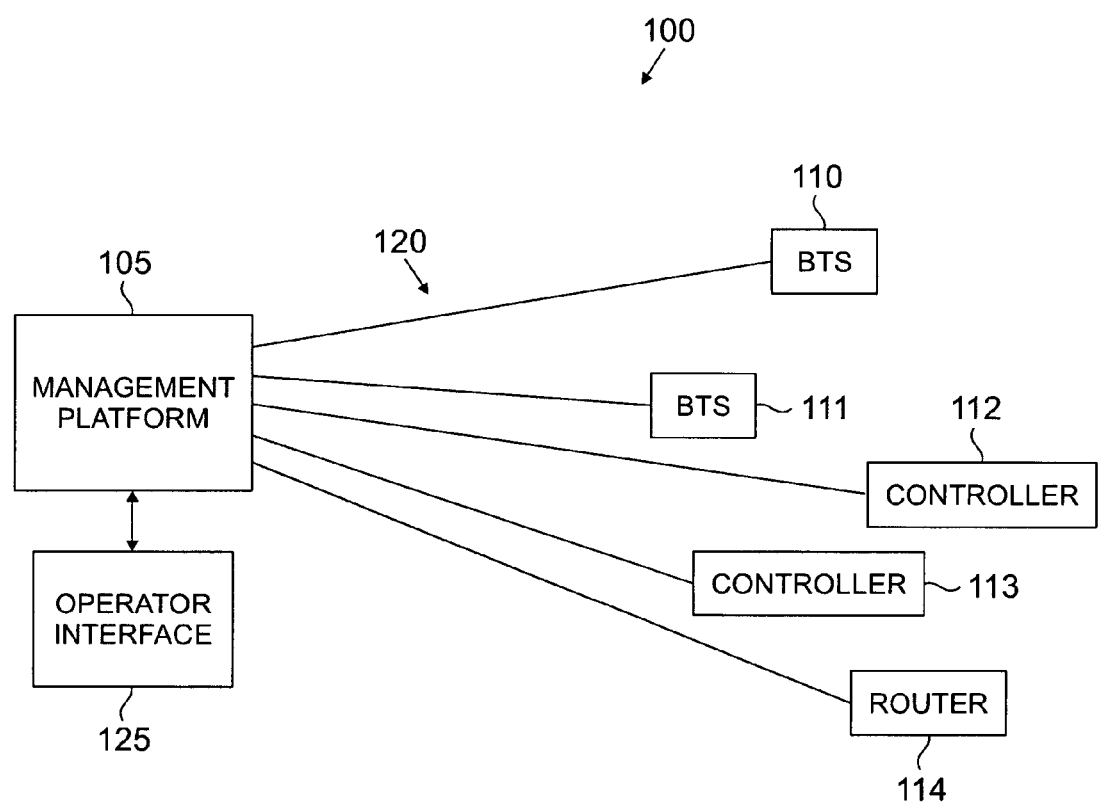
FIG. 1 illustrates an exemplary communication network that is capable of providing efficient object-based accessibility according to an embodiment of the present disclosure.

FIG. 1 illustrates an exemplary communication network 100 that is suitable for providing efficient object-based resource accessibility according to one embodiment of the present disclosure. Communication network 100 comprises a management platform 105 and a plurality of network elements, such as base transceiver stations (BTSs) 110-111, controllers 112-113, routers 114, and the like. For example, additional network elements may comprise switches, service creation points, protocol converters, interface cards, channel cards, transcoders, radios and/or any other suitable network elements.

Management platform 105 may comprise a computer, a Sun server or any other suitable device capable of managing network elements 110-114 as described in more detail below. Management platform 105 and network elements 110-114 are operable to communicate with each other over communication links 120, which may comprise T1 lines, IP links through the Internet and/or any other suitable type of communication links.

Communication network 100 also comprises an operator interface 125 that is operable to provide an interface between management platform 105 and an operator of management platform 105. Thus, using operator interface 125, an operator may interact with management platform 105 and prompt management platform 105 to perform management functions. In addition, management platform 105 is operable to provide near real-time status information for network elements 110-114 to the operator using operator interface 125. For example, management platform 105 may generate a red icon and/or an alarm bell at operator interface 125 in order to notify the operator of an alarm condition at one of network elements 110-114.

Management platform 105 is operable to manage network elements 110-114. Although the illustrated embodiment shows five network elements 110-114, it will be understood that management platform 105 is operable to manage any suitable number of network elements 110-114, including hundreds, thousands, millions, or more of network elements 110-114.

In managing network elements 110-114, management platform 105 is operable to configure network elements 110-114, to execute diagnostic testing, to report operational measurements, to report fault conditions within communication network 100, to issue management commands to network elements 110-114 based on data received from network elements 110-114 and/or from the operator through operator interface 125 and/or to perform any other suitable management functions.

As described in more detail below in connection with FIGS. 2-4, management platform 105 is operable to instantiate an object for a particular network element 110-114 when a reference to be used to access the network element 110-114 is requested and to delete the object when the network element 110-114 is no longer being accessed. In this way, management platform 105 may manage extremely large numbers of network elements 110-114 efficiently.

Figure 2:
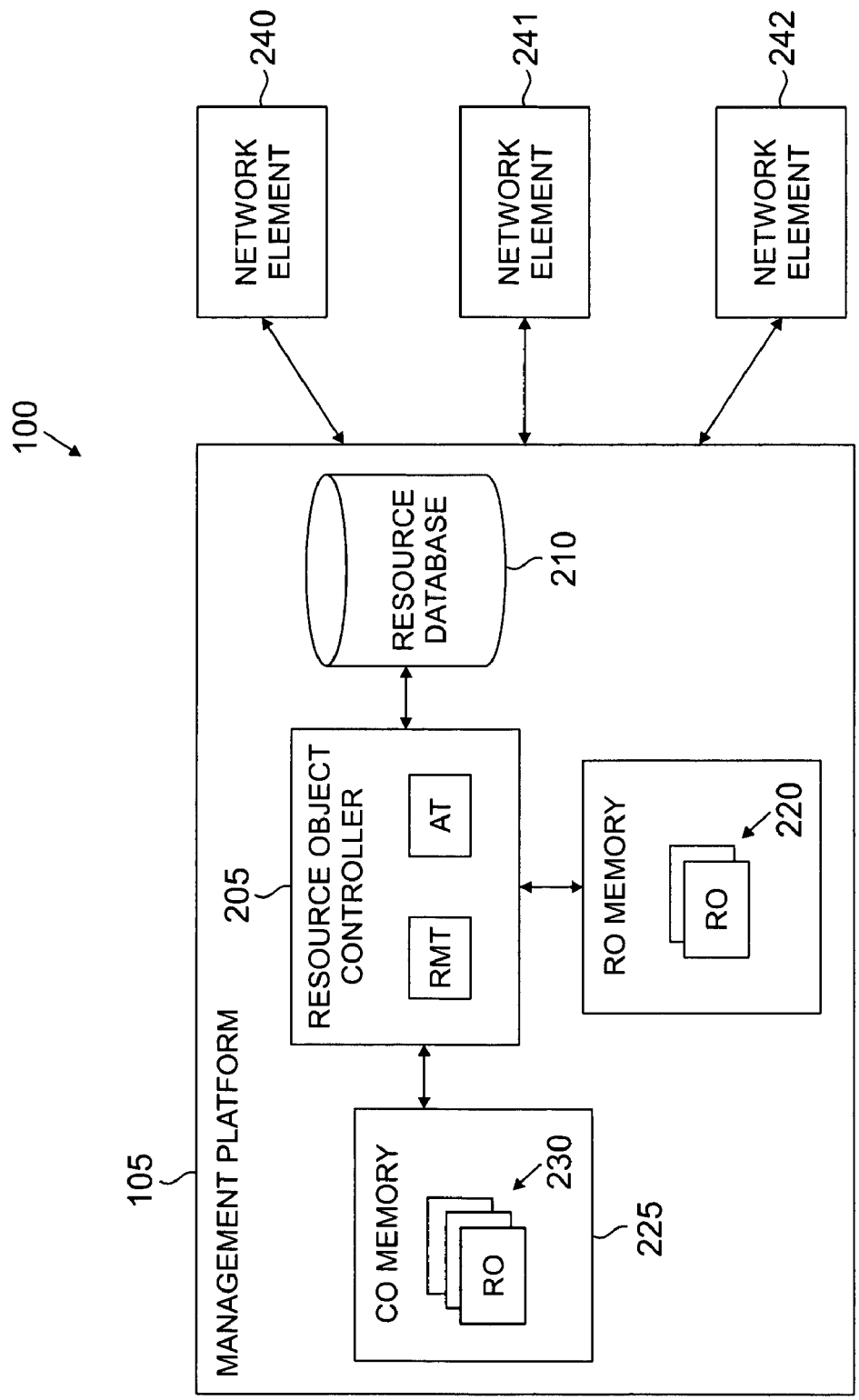
FIG. 2 illustrates details of a portion of the communication network of FIG. 1 according to an embodiment of the present disclosure.

FIG. 2 illustrates details of a portion of communication network 100 according to one embodiment of the present disclosure. Management platform 105 comprises a resource object controller 205, a resource database 210, a resource object (RO) memory 215 for storing resource objects 220, and a collaborating object (CO) memory 225 for storing collaborating objects 230. Management platform 105 may comprise any suitable component capable of creating instances of resource objects 220 for use by collaborating objects 225, as described below.

Management platform 105 is operable to manage a plurality of network elements 240, 241 and 242. It will be understood that network elements 240-242 may correspond to any of network elements 110-114 and may comprise any suitable type of manageable network element, as described above in connection with FIG. 1. The resource objects 220 represent a model of the network elements 240-242. The collaborating objects 230 may manage the network elements 240-242 by interacting with the resource objects 220, for example reading alarm information and performance information from the resource objects 220 and writing control and/or configuration information to the resource objects 220. In an embodiment, resource objects 220 provide methods or functions by which the collaborating objects interact with the resource objects 220. Invoking the methods or functions may be accomplished using a reference to the subject resource object 220. In an embodiment, the methods or functions for reading from the resource object 220 may involve the resource object method reading from the associated network element 240, and the methods or functions for writing to the resource object 220 may involve the resource object method writing to the associated network element 240. In another embodiment, some other means may be employed for conveying information between the resource objects 220 and the network elements 240.

Although management platform 105 is illustrated with a local resource database 210, it will be understood that a portion or all of resource database 210 may be implemented remotely from management platform 105. In addition, although the illustrated embodiment comprises two resource objects 220, three collaborating objects 230, and three network elements 240-242, it will be understood that management platform 105 may store any suitable number of resource objects 220 in RO memory 215 and any suitable number of collaborating objects 230 in CO memory 225 and may manage any suitable number of network elements 240-242, including up to hundreds, thousands, millions, or more, without departing from the scope of the present invention. For one embodiment, resource object controller 205, RO memory 215 and CO memory 225 may reside within a virtual memory of the same application.

Resource object controller 205 comprises a resource mapping table (RMT) 260. Resource mapping table 260 comprises any suitable data store that is operable to store a resource handle, a resource reference, and a reference count for each resource object 220 stored in RO memory 215. The resource handle is operable to identify a resource object 220 stored in RO memory 215 and is also operable to identify the corresponding original resource object in resource database 210. For example, the resource handle may comprise a resource name or a resource identifier. The resource reference may be used by a collaborating object 230 to access the corresponding resource object 220 stored in RO memory 215. Thus, for example, the resource reference may comprise an address in RO memory 215 at which the resource object 220 is stored. The reference count is operable to store a count of the number of collaborating objects 230 that have requested a reference for the corresponding resource object 220 and have not yet released the resource object 220.

Resource object controller 205 is operable to activate resource objects 220 based on original resource objects stored in resource database 210 and to deactivate resource objects 220 stored in RO memory 215. As used herein, to "activate" a resource object 220 means to instantiate the resource object 220, which corresponds to an original resource object in resource database 210, in RO memory 215. To instantiate the resource object 220, resource object controller 205 creates an instance of the original resource object as stored in resource database 210 in RO memory 215. This may involve copying data in the original resource object into the newly created resource object 220. Similarly, to "deactivate" a resource object 220 means to store the resource object 220 in resource database 210 in place of the original resource object which was used to instantiate the resource object 220, to delete the resource handle, the resource reference and the reference count for the resource object 220 from resource mapping table 260, and to delete the resource object 220 from RO memory 215.

For some embodiments, resource object controller 205 may comprise an access timer 265. For these embodiments, access timer 265 is operable to wake up periodically and to perform an aging check on each resource object 220. If a specified amount of time has expired following a most recent access of a specified resource object 220, access timer 265 is operable to notify resource object controller 205 of the expiration, indicating that the specified resource object 220 should be deactivated. Each resource object 220 may have an associated maximum length for a typical transaction for that resource object 220. For a particular embodiment, access timer 265 may be operable to notify resource object controller 205 of a timer expiration after a period of time equal to a predetermined multiple, such as three or four, of the maximum length for a typical transaction has expired without the specified resource object 220 being accessed. However, it will be understood that access timer 265 may notify resource object controller 205 of a timer expiration after any suitable length of time without an access.

Resource database 210 may comprise a relational database, an object database, a flat-file system, a non-volatile RAM, an Oracle system, an Informix system, a MySQL system, or any other suitable type of data store. Resource database 210 is operable to store an original resource object for each network element 240-242 in communication network 100.

RO memory 215 may comprise a virtual memory in management platform 105. However, it will be understood that RO memory 215 may comprise any suitable type of local memory in management platform 105. RO memory 215 is operable to store resource objects 220 instantiated in management platform 105 based on reference requests received at resource object controller 205 from collaborating objects 230. Thus, RO memory 215 need not store a resource object 220 for each network element 240-242 in communication network 100 but simply for those network elements 240-242 for which a reference has been requested by a collaborating object 230.

CO memory 225 may comprise any suitable type of local memory in management platform 105. CO memory 225 is operable to store collaborating objects 230 for management platform 105. For one embodiment, each of one or more software applications suitable for managing network elements 240-242, such as fault management applications or the like, may comprise one or more collaborating objects 230.

Figure 3:
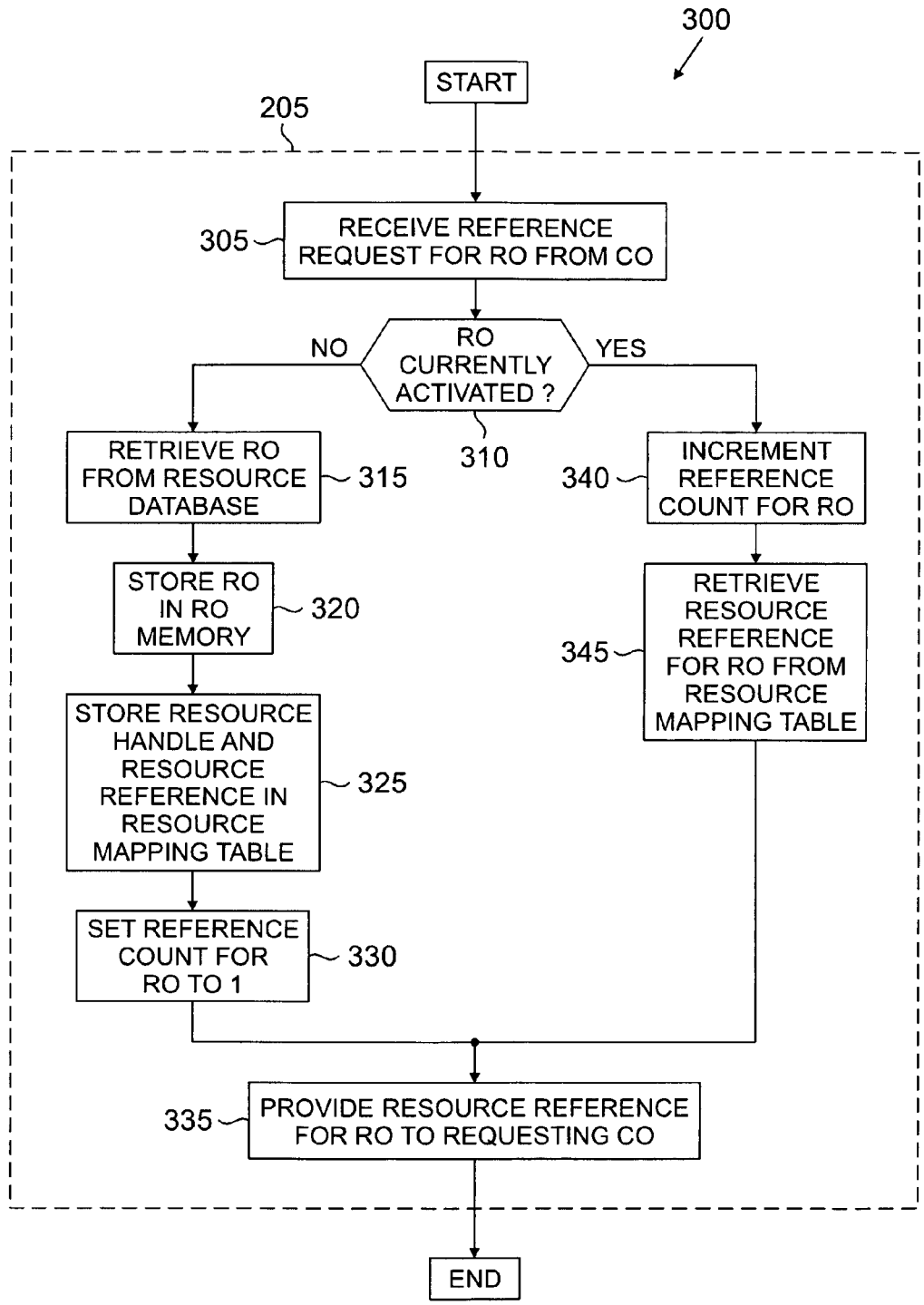
FIG. 3 is a flow diagram illustrating a method for activating resource objects in the management platform of FIG. 2 according to an embodiment of the present disclosure.

FIG. 3 is a flow diagram illustrating a method 300 for activating resource objects 220 in management platform 105 according to an embodiment of the present disclosure. Initially, resource object controller 205 receives a reference request for a particular resource object (RO) from a collaborating object (CO) 230 (process step 305). A reference request may comprise a request by the collaborating object 230 for a resource reference that may be used to access the resource object, which is identified by a resource handle.

In response to the reference request, resource object controller 205 determines whether or not the requested resource object is currently activated (process step 310), as indicated by resource object controller 205 determining that the requested resource object is stored as a resource object 220 in RO memory 215. For example, resource object controller 205 may search resource mapping table 260 for the resource handle that identifies the resource object. If resource object controller 205 finds the resource handle in resource mapping table 260, resource object controller 205 determines that the resource object 220 is currently activated. However, if resource object controller 205 does not find the resource handle in resource mapping table 260, resource object controller 205 determines that the resource object 220 is not currently activated.

If the resource object 220 is not currently activated (process step 310), resource object controller 205 retrieves a copy of the original resource object from resource database 210 (process step 315) and stores the resource object 220 in RO memory 215 (process step 320). Resource object controller 205 then stores the resource handle and the resource reference for the resource object 220 in resource mapping table 260 (process step 325) and sets the reference count for the resource object 220 to 1 (process step 330). Resource object controller 205 then provides the resource reference for the resource object 220 to the requesting collaborating object 230 (process step 335), which allows the collaborating object 230 to access the resource object 220.

If resource object controller 205 determines that the resource object 220 is currently activated (process step 310), resource object controller 205 increments the reference count for the resource object 220 (process step 340). Resource object controller 205 then retrieves the resource reference for the resource object 220 from resource mapping table 260 (process step 345) and provides the resource reference for the resource object 220 to the requesting collaborating object 230, which allows the collaborating object 230 to access the resource object 220.

Figure 4:
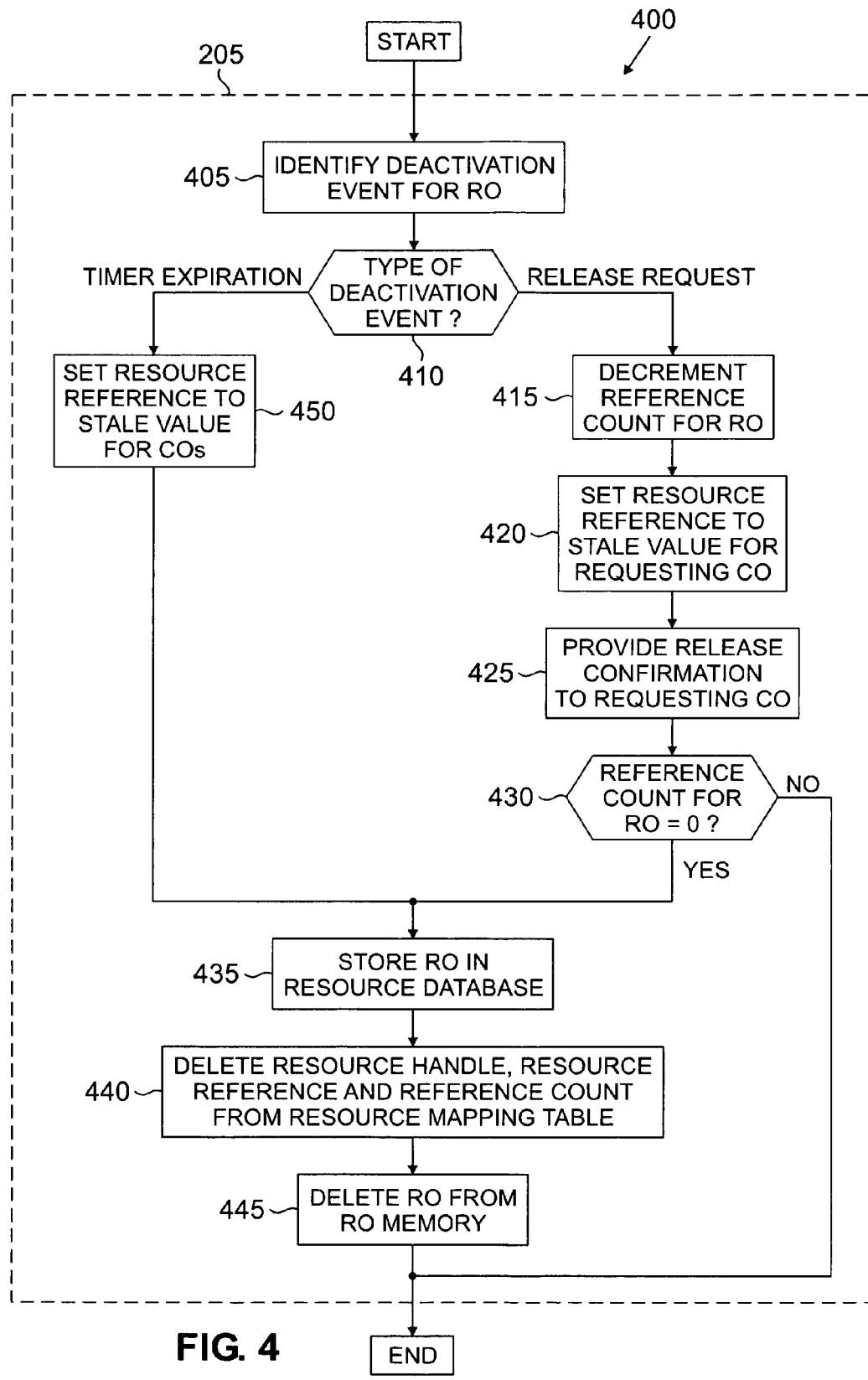
FIG. 4 is a flow diagram illustrating a method for deactivating resource objects in the management platform of FIG. 2 according to an embodiment of the present disclosure.

FIG. 4 is a flow diagram illustrating a method 400 for deactivating resource objects 220 in management platform 105 according to an embodiment of the present disclosure. Initially, resource object controller 205 identifies a deactivation event for a particular resource object 220 (process step 405). A deactivation event may comprise receiving a release request for the resource object 220 from a collaborating object 230 or receiving a notification that the access timer 265 for the resource object 220 has expired.

If the deactivation event was the receipt of a release request from a collaborating object 230 (process step 410), resource object controller 205 decrements the reference count for the resource object 220 in resource mapping table 260 (process step 415). Resource object controller 205 then sets the resource reference for the resource object 220 to a stale value for the requesting collaborating object 230 (process step 420). As used herein, "stale value" means that the value is not operable to provide a reference to any resource object 220.

Resource object controller 205 may then provide a release confirmation to the requesting collaborating object 230 (process step 425). The release confirmation may be operable to confirm a successful release of the resource object 220 for the collaborating object 230 and may comprise the stale resource reference. Alternatively, resource object controller 205 may provide a separate message to the requesting collaborating object 230 with the stale resource reference.

Resource object controller 205 then determines whether or not the reference count for the resource object 220 is zero (process step 430). If the reference count is not zero, at least one additional collaborating object 230 has requested a reference for accessing the resource object 220 and has not released the resource object 220. In this case, resource object controller 205 has finished responding to the release request.

However, if the reference count is zero (process step 430), resource object controller 205 stores the resource object 220 in resource database 210 in place of the original resource object on which the resource object 220 was based (process step 435) deletes the resource handle, resource reference, and reference count for the resource object 220 from resource mapping table 260 (process step 440), and deletes the resource object 220 from RO memory 215 (process step 445).

If the deactivation event was not the receipt of a release request but the receipt of a timer expiration notification from access timer 265 (process step 410), resource object controller 205 sets the resource reference for the resource object 220 to a stale value for any collaborating objects 230 that have requested a reference for the resource object 220 and have not requested release of the resource object 220 (process step 450). After setting the resource reference to a stale value, resource object controller 205 stores the resource object 220 in resource database 210 in place of the original resource object on which the resource object 220 was based (process step 435), deletes the resource handle, resource reference, and reference count for the resource object 220 from resource mapping table 260 (process step 440), and deletes the resource object 220 from RO memory 215 (process step 445).

For an alternative embodiment, resource object controller 205 may store the resource object 220 in resource database 210 in place of the original resource object on which the resource object 220 was based (process step 435) before resource object controller 205 determines whether or not the reference count for the resource object 220 is zero (process step 430). In this way, the original resource object in resource database 210 is updated with each release request by a collaborating object 230 instead of only when the resource object 220 is released by the last collaborating object 230 that is accessing the resource object 220.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method for providing efficient object-based network management, comprising:
    receiving a reference request from a collaborating object for a reference to an object, the object representing one of a number of managed network elements that are managed by a plurality of collaborating objects, the collaborating object being one of the plurality of collaborating objects, and each of the plurality of collaborating objects corresponding to one of a number of applications;
    determining whether the object is currently activated in a management platform;
    activating the object based on the reference request for the reference to the object when the object is not currently activated;
    providing the reference to the object to the collaborating object;
    receiving a release request from the collaborating object;
    providing a release confirmation to the collaborating object in response to the release request from the collaborating object, the release confirmation comprising setting the reference to the object to a stale value for the collaborating object; and
    managing a count of references to the object.

2. The method as set forth in claim 1, wherein activating the object comprises:
    creating an instance of the object in a memory of the management platform, wherein the instance of the object is a copy of a corresponding original object stored in a repository;
    adding an entry including the reference to the object and a handle for the object to a mapping table, wherein the reference to the object is a reference to the instance of the object.

3. The method as set forth in claim 2, further comprising:
    incrementing the count of references to the object in response to receiving the reference request for the object, when the object is activated; and
    retrieving the reference to the object when the object is currently activated.

4. The method as set forth in claim 1, further comprising releasing the object in response to receiving a release request from the collaborating object, wherein releasing the object comprises:
    decrementing the count of references to the object.

5. The method as set forth in claim 1, further comprising deactivating the object when the count of references to the object drops below a threshold, wherein deactivating includes:
    copying a content of an instance of the object over a corresponding original object stored in a repository;
    deleting the instance of the object from a memory in the management platform; and
    removing an entry, including the reference to the object and a handle for the object, from a mapping.

6. The method as set forth in claim 1, wherein the at least one managed network element associated with the object is managed at least partially by the collaborating object invoking one or more of the functions of the object.

7. A method for providing efficient object-based network management, comprising:
    providing a reference to an object to a collaborating object in response to a reference request from the collaborating object;
    detecting a deactivation event for the object in a management platform;
    identifying a type of the deactivation event, the type being one of a timer expiration and a request from the collaborating object to release the object, the object representing one of a number of managed network elements that are managed by a plurality of collaborating objects, the collaborating object being one of the plurality of collaborating objects, and each of the plurality of collaborating objects corresponding to one of a number of applications; and
    in response to identifying the request from the collaborating object to release the object, providing a release confirmation to the collaborating object upon releasing the object, the release confirmation comprising setting the reference to the object to a stale value for the collaborating object;

based on the deactivation event, determining whether to deactivate the object; and managing a count of references to the object.

8. The method as set forth in claim 7, further comprising deactivating the object after determining to deactivate the object, wherein deactivating the object comprises:
copying a content of an instance of the object over a corresponding original object stored in a repository;
deleting the instance of the object from a memory in the management platform; and
removing a table entry that corresponds to the object from a mapping table.

9. The method as set forth in claim 8, wherein determining whether to deactivate the object is based on the count of references to the object when the request to release the object is identified.

10. The method as set forth in claim 7, further comprising:
decrementing the count of references to the object in response to identifying the request to release the object.

11. The method as set forth in claim 10, further comprising determining to deactivate the object when the decremented count of references to the object drops below a threshold.

12. The method as set forth in claim 7, wherein the timer expiration is a notification that an access timer for the object has expired.

13. The method as set forth in claim 12, further comprising:
setting the reference for the object to the stale value for every collaborating object that has a valid resource reference for the object; and
deactivating the object.

14. The method as set forth in claim 12, the access timer operable to expire after a period of time equal to a predetermined multiple of a maximum length for a typical transaction for the object.

15. A management platform, comprising:
a first memory operable to store a plurality of objects; and
a controller configured to:
create an instance of an object in the first memory based on receiving a reference request for the object from a collaborating object, the object representing one of a number of managed network elements that are managed by a plurality of collaborating objects, the collaborating object being one of the plurality of collaborating objects, and each of the plurality of collaborating objects corresponding to one of a number of applications,
provide a reference to the created object to the collaborating object, and
release the object based on receiving a release request for the object from the collaborating object by providing a release confirmation to the collaborating object, the release confirmation comprising setting the reference to the object to a stale value for the collaborating object.

16. The management platform as set forth in claim 15, the controller further configured to create the instance of the object in the first memory based on receiving the reference request when the object is not stored in the first memory.

17. The management platform as set forth in claim 16, the controller further configured to store a handle for the object when the instance of the object is created in the first memory and to determine whether the object is stored in the first memory based on the handle.

18. The management platform as set forth in claim 17, wherein the instance of the object is created by copying a portion of the content of a second memory as a data component of the object and storing the object in the first memory.

19. The management platform as set forth in claim 15, the controller further configured to delete the object from the first memory based on a deactivation event.

20. The management platform as set forth in claim 19, the deactivation event comprising one of receiving a request to release the object and receiving a notification that an access timer for the object has expired.

21. The management platform as set forth in claim 19, the controller further configured to:
increment a count of references to the object in response to receiving the reference request for the object;
decrement the count of references to the object in response to receiving the release request for the object; and
determining the deactivation event when the count of references is below a predetermined value.

* * * * *